No. 767,095. PATENTED AUG. 9, 1904.
G. S. ZEPP.
DRIVE CHAIN COUPLING.
APPLICATION FILED DEC. 11, 1903.
NO MODEL.
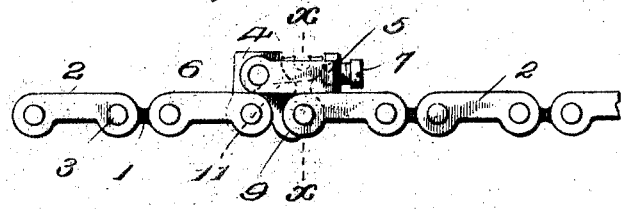
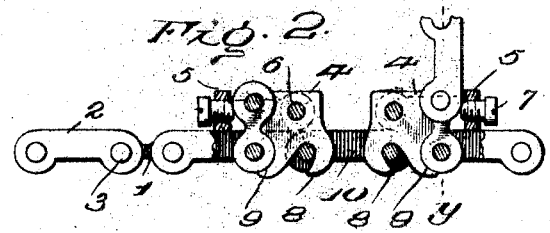
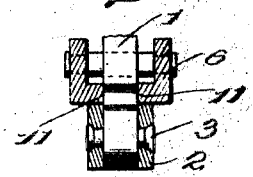
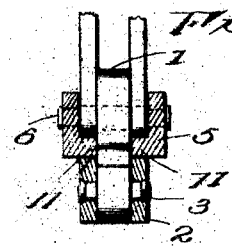
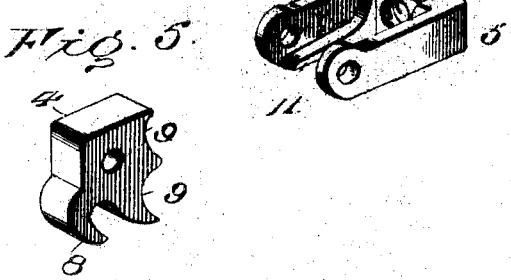
Inventor
G. S. Zepp.
Witnesses
Jno. Wheeler.
By R. S. & A. P. Lacey,
his Attorneys No. 767,095.

Patented August 9, 1904.

UNITED STATES PATENT OFFICE.

GUY S. ZEPP, OF ALEXANDRIA, VIRGINIA.

DRIVE-CHAIN COUPLING.

SPECIFICATION forming part of Letters Patent No. 767,095, dated August 9, 1904.

Application filed December 11, 1903. Serial No. 184,798. (No model.)

*To all whom it may concern:*

Be it known that I, GUY S. ZEPP, a citizen of the United States, residing at Alexandria, in the county of Alexandria and State of Virginia, have invented certain new and useful Improvements in Drive-Chain Couplings, of which the following is a specification.

This invention provides a simple and effective means for repairing the drive-chains of road-machines—such as bicycles, tandems, automobiles, and the like—embodying a chain as the power-translating means.

The coupling comprises a block or clamp member, a shackle pivoted thereto, and a clamp-screw for connecting the shackle to the link at one end of the chain to be connected, the block or clamp member being provided with a hook to engage with the link at the opposite end of the chain or with a link for connecting companion couplings applied to opposite ends of the chain.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a side view showing the invention when applied for connecting the ends of a drive-chain. Fig. 2 is a view similar to Fig. 1, showing duplicate couplings applied to the terminal links of the chain to be connected, said couplings being connected by a link, the parts being in section. Fig. 3 is a transverse section on the line X X of Fig. 1. Fig. 4 is a transverse section on the line Y Y of Fig. 2. Fig. 5 is a detail perspective view of the block or clamp-bar. Fig. 6 is a detail perspective view of the shackle.

Corresponding and like parts are referred to in the following description and indicated in all the views of the drawings by the same reference characters.

The drive-chain illustrated is of ordinary construction, being composed of solid or bar links 1 and open links 2, alternately arranged and connected by means of rivets or cross-bars 3.

The coupling consists of the block or clamp member 4, the shackle 5, loosely or pivotally connected to the part 4 by the rivet or fastening 6, and the clamp-screw 7, threaded into the outer end bar of the shackle 5. The block or clamp member 4 is provided with the hook 8 for engagement with the rivet or cross-bar of the link to be coupled thereto, whether the same be a part of the drive-chain or an independent connecting-link, as in Fig. 2. The inner end of the block or clamp member 4 is provided with corresponding depressions 9 for reception of the enlargements at the ends of the bar-link 1 when turned at a right angle to the length of the chain, as indicated most clearly in Figs. 1 and 2, thereby preventing any possible slipping of the coupling when properly applied. The clamp-screw 7 at the outer or free end of the shackle 5 is adapted to be turned up against the enlargement or eye of the link against which the block or clamp member 4 is fitted, so as to securely hold said link between the parts 4 and 7 and prevent any possible displacement. The relative length or proportions of the parts 4 and 5 is such that when the coupling is applied, as indicated in Figs. 1 and 2, the distance between the members or cross-bars 3 of the connected links corresponds to the distance between like parts of the other links of the chain, whereby the latter may run smoothly and obviate jar or any binding when the coupling passes around the toothed portion of the sprocket-wheels with which the drive-chain coöperates.

It is to be understood that the coupling is constructed in various sizes, so as to operate with the different sizes of drive-chains, according to the load or work for which they are intended. In the event of the eye portion of a bar-link breaking, as indicated in Fig. 1, the broken link is turned outward from the length of the chain and the block or clamp member 4 is fitted against the outer side thereof and the shackle turned to embrace the outer end, after which the clamp-screw 7 is turned up to bind or grip the link between the parts 4 and 7. The hook 8 is engaged with the cross-bar or rivet of the open link, thereby completing the connection.

In the event of an open link breaking, as indicated in Fig. 2, it becomes necessary to use a pair of couplings, one being fitted to the solid or bar link at one end of the chain and the other being fitted to the solid or bar link coupled to the broken open link. The two couplings are connected by an independent connecting-link, as 10, similar to the open links of the drive-chain. When the coupling is constructed for use in this manner, it is necessary to have the side bars of the shackle spaced apart a distance to embrace opposite sides of the open link. In order that there may be no lateral play, inner extensions 11 are provided upon the side bars of the shackle to embrace opposite sides of the bar or solid link to which the broken open link is connected, as indicated most clearly in Figs. 2 and 4. The inner ends of the extensions 11 are widened to obtain a snug fit against the eye end of the bar-link, as indicated most clearly in Fig. 6.

Having thus described the invention, what is claimed as new is—

1. A coupling for connecting or repairing drive-chains, the same comprising a block or clamp member provided with a hook for engagement with a link-terminal, a shackle connected to said block to engage over the end portion of a link, and a clamp-screw threaded into the outer or free end of the shackle, substantially as set forth.

2. A coupling for connecting or repairing drive-chains, the same comprising a block or clamp member having an engaging hook, a shackle pivoted to said block, and a clamp-screw threaded into the outer or free end of the shackle for coöperation with the aforesaid block to clamp the link to be gripped, substantially as specified.

3. A coupling for connecting or repairing drive-chains, the same comprising a block or clamp member having an edge portion provided with companion depressions and having an engaging hook, a shackle connected to said block, and a clamp-screw threaded into the end bar of the shackle for coöperation with the block to clamp the link to be gripped, substantially as specified.

4. A coupling for connecting corresponding links of a drive-chain, the same comprising a block or clamp member having an edge portion provided with companion depressions and formed with an engaging hook, a shackle pivotally connected to the block, and a clamp-screw threaded into the end bar of the shackle, substantially as specified.

5. A coupling for the purposes specified, comprising a block or clamp member provided with a link-engaging device, a shackle pivoted to said block and having inner longitudinal extensions upon the inner faces of its side bars, and a clamp-screw threaded into the end bar of the shackle for coöperation with the block, substantially as set forth.

In testimony whereof I affix my signature in presence of two witnesses.

GUY S. ZEPP. [L. S.]

Witnesses:
 GENEVIEVE MATTHEWS,
 EMILY H. ENGLAND.